Aug. 6, 1968    G. A. WESSELINK    3,396,343
OPTICAL MASER WITH AN ADJUSTING MECHANISM FOR A MIRROR
Filed Sept. 25, 1963    2 Sheets-Sheet 1

INVENTOR.
GUSTAAF A. WESSELINK.
BY
AGENT

Aug. 6, 1968   G. A. WESSELINK   3,396,343
OPTICAL MASER WITH AN ADJUSTING MECHANISM FOR A MIRROR
Filed Sept. 25, 1963   2 Sheets-Sheet 2

INVENTOR.
GUSTAAF A. WESSELINK
BY
*Frank R. Trifari*
AGENT

United States Patent Office
3,396,343
Patented Aug. 6, 1968

3,396,343
OPTICAL MASER WITH AN ADJUSTING MECHANISM FOR A MIRROR
Gustaaf Adolf Wesselink, Emmasingel, Eindhoven, Netherlands, assignor to North American Philips Company, Inc., New York, N.Y., a corporation of Delaware
Filed Sept. 25, 1963, Ser. No. 311,453
Claims priority, application Netherlands, Oct. 11, 1962, 284,259
6 Claims. (Cl. 331—94.5)

ABSTRACT OF THE DISCLOSURE

An optical maser having at least one mount having a tapered portion mounted in a tapered bore whereby the mount is rotatable about a first axis and is at an acute angle with the axis N. The support is also provided with a tapered portion fitted within a tapered opening. The support is rotatable about a second axis which makes an acute angle with the first axis.

---

The invention relates to an optical system comprising at least one adjusting mechanism for an optical element, for example a mirror or a lens, in which the optical axis N of the element, for example, a normal on the mirror surface of a mirror or the axis of a lens is adjustable within a space angle.

Optical systems of the kind set forth are formed by many types of interferometers, spectrometers, the optical systems of optical masers and the like. The adjusting mechanism of known optical systems is formed, for example, by a number of set screws by means of which the position of a resiliently suspended supporting body can be adjusted, the optical element being connected with this supporting body. The resilient suspension of the supporting body and the use of set screws involve a complicated structure of such systems and during the manufacture of such systems the accurate proportioning of the required component parts and the accurate assembly thereof occupy much time.

The invention has for its object to provide an optical system of the kind set forth, the manufacture and the structure of which are particularly simple.

An optical system having at least one adjusting mechanism for an optical element, for example a mirror or a lens, in which an optical axis N of the element, for example a normal on the reflective surface of a mirror or the axis of a lens is adjustable within a space angle, is characterized in accordance with the invention in that the optical element, provided with a support, is supported so as to be rotatable about a line A by a supporting body, which is held by a holder so as to be rotatable about a line B, the lines A and B being at an acute angle α to each other and the optical axis N and the line A being at an acute angle β to each other. This provides a particularly simple structure comprising three parts, which are interconnected so as to be relatively rotatable.

It should be noted that an acute angle to denote here an angle smaller than 90°.

If the angle β is smaller than the angle α, the space angle within which the optical axis N is adjustable is equal to a space angle lying between two cone surfaces having the same conical axis and their top at the same place, the apieces being equal to 2α+2β and 2α−2β.

If the angle β is larger than or equal to the angle α, the space angle within which the optical axis N is adjustable is equal to the space angle included by a cone surface having an apex of 2α+2β. With a preferred embodiment of an optical system according to the invention the angle β is at least equal to the angle α.

The accuracy of adjustment of the optical axis N increases according as the angles α and β are smaller. In practice a great accuracy is usually only required within a small space angle. Therefore the angles α and β are preferably smaller than 10° or even smaller than 4°.

A very simple and effective structure is characterized, in accordance with the invention, in that the holder is provided with a bore traversing preferably the whole holder and in that the supporting body is rotatably arranged in said bore with a part fitting therein and in that the supporting body is also provided with a bore which preferably passes through the whole supporting body and in which the support is rotatably arranged with a part fitting therein. This structure is very compact, since the parts are disposed at least partly one in the other.

Very advantageous is a structure in which at least one of the said bores and the part fitting therein are tapering. Thus, the relative places of the bodies are fixed in a simple manner, while the parts can be very easily ground to fit accurately in each other.

At least the support is preferably made of optical material for example glass or quartz. Such material permits of grinding accurately fitting, rotatable bodies and in many cases it is advantageous for at least the support to be transparent, particularly if the system is used in optical masers.

A particularly advantageous embodiment of an optical system according to the invention is characterized in that the optical element is formed by a preferably flat mirror, while the support has a flat surface part opposite the mirror, said part being substantially at right angles to the adjustable optical axis N of the mirror, whilst a light beam can strike said surface part, which beam is reflected at least mainly on one of the surface parts formed by the first-mentioned surface part and the rear side of the mirror. Thus by means of the said light beam the position of the mirror can be simply checked, even in operation, since the mirror surface itself need not be used to this end.

If the optical element is a mirror, for example a flat mirror, it may consist of a glass plate having a metallised surface or a reflective metal plate. The mirror may be fastened for example by cementing it to the support. A simpler structure consists in that the mirror is formed by a reflective surface part, for example a metallised surface part of the support.

A further preferred embodiment of the invention is characterized in that the support is also provided with a bore and in that the optical element is arranged in said bore or at least in the prolongation thereof. In many cases it is desirable that from two opposite sides light should be permitted to strike the optical element. This is particularly the case when the optical element is formed by a lens.

It should be noted that, as usual, a lens is to denote also an assembly of lenses.

The optical element may also be a spherical or parabolic mirror, in which case, as usual, the optical axis N is the axis or symmetry going through the centre of the sphere or the focus of the paraboloid, of which the mirror surface forms part.

The invention furthermore relates to an optical maser, preferably a liquid maser or a gas maser, comprising at least one optical system according to the invention, in which the maser comprises a cavity intended for containing a medium in which stimulated emission of radiation can be producted, whilst the emitted radiation can be reflected from two opposite, preferably flat mirrors lying each on one side of the medium, whilst a normal on the surface of one mirror can be adjusted parallel to the normal on the surface of the other mirror and one mirror constitutes the optical element of the said optical system. It is known that an optical maser is a source of coherent radiation, which leaves the cavity of the maser through at least one of the mirrors, which is to this end partially transparent. It will be explained more fully hereinafter in the description of embodiments that an optical system according to the invention is particularly suitable for use in a maser. With respect to known optical masers having an adjustable mirror a particularly simple, compact and hand operated structure is obtained, particularly since an optical system according to the invention can be effectively joined to the wall of the maser cavity. With fluid masers and gas masers it is often very desirable for the mirrors to be in contact with the liquid or gaseous medium, whilst at least one of the mirrors should be adjustable and the cavity containing the medium should yet be satisfactory sealed. This can be realized very satisfactorily with the aid of an optical system according to the invention.

It should be noted that an optical maser is a source of coherent radiation, which consists of visible light or, for example infrared or ultraviolet light. The term "light" and terms derived therefrom are therefore to be understood to include, in a broad sense, also infrared radiation and ultraviolet radiation, for example.

The invention will now be described more fully with reference to the drawing, which shows a few embodiments.

FIG. 1a shows one embodiment of an optical system according to the invention, comprising an adjusting mechanism for a flat mirror 1, in which a normal N on the mirror surface 5 is adjustable within a space angle.

Figure 1A:
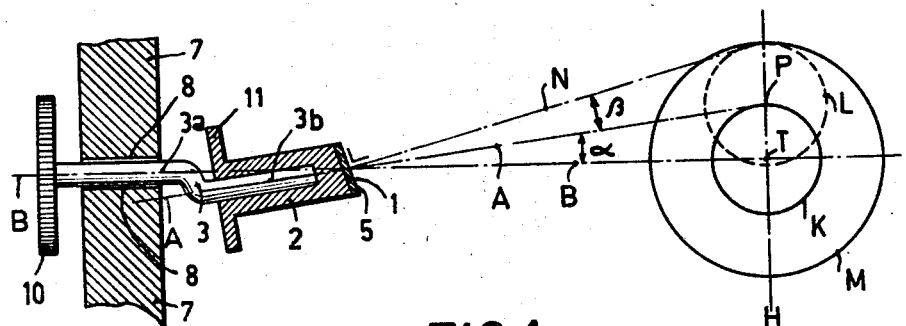
FIGS. 1a and 1b show diagrammatically a cross sectional view of an optical system embodying the invention and space angles in which the optical axis N is adjustable.

The mirror 1 is provided with a support 2 and is adapted to turn about the line A. The line A is the center line of the part 3b of the supporting body 3, which is shaped in the form of a rod, which is curved as is shown in the figure and which has two rod-shaped portions 3a and 3b, the center lines B and A of which are at an acute angle α. For example, cylindrical support 2 is adapted to turn about the rod-shaped portion 3b of the supporting body 3.

The supporting body 3 is held by the holder 7 and is adapted to turn about the line B and the rod-shaped portion 3a of the supporting body 3 fits in a bore 8 of the holder 7.

The supporting body 3 is furthermore provided with a disc-shaped part 10, so that the body 3 can be readily turned. The support 2 is provided for the same reason with a flange 11.

The support 3 may, for example, be a metal bar bent in the desired shape, to which a metal disc 10 is secured, for example by soldering or welding. The holder 7 and the support 2 may also be made of metal.

The mirror 1 may be formed by a plano-parallel glass plate, which is unilaterally metalized. The mirror 1 may be cemented to the support 2. The mirror 1 may also be formed by a reflective surface part of the support 2. A satisfactory, simple mirror is obtained, when the support consists, for example, of glass, nylon or quartz and the mirror is formed by a metallised surface part thereof.

The device operates as follows.

When the supporting body 3 or the support 2 is turned, the line B remains in its rest position. If the supporting body 3 is turned, the line A describes a conical surface with the line B as the axis, while the apex is equal to $2\alpha$. For the sake of clarity the circle of intersection K of this conical plane is shown with a plane going through the broken line H. This plane is at right angles to the line B and the plane of the drawing at an arbitrary distance from the mirror 1. The circle K is drawn in the plane of the drawing and must therefore be considered to have been turned through 90° from the broken line H. The further circles of intersection are drawn in the same manner.

In each position of the line A and when the support 2 is turned about the line A, the normal N on the mirror surface 5 describes a conical plane having the line A as an axis. The angle between the lines A and N is $\beta$, so that the apex of the last-mentioned conical plane is $2\beta$. This conical plane yields for example the circle of intersection L, when the line A passes through the point P of the circle K.

Since at any possible point $p$ on the circle K there is a circle L, it will be obvious that all possible circles L completely fill out the plane within the circle M, which thus forms the envelope of the circles L. The normal N may therefore occupy any position within a space angle formed by a conical plane having the line B as the axis and the circle M as the circle of intersection. The apex of this conical plane is $2\alpha+2\beta$.

Figure 1B:
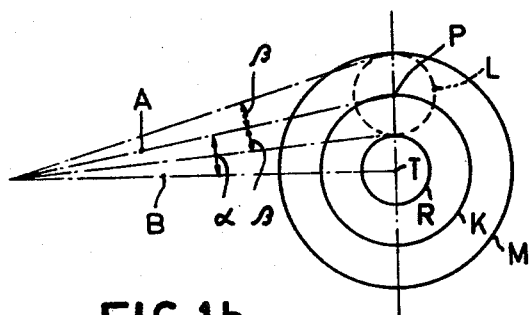

In the case described above the angle $\beta$ is larger than the angle $\alpha$, so that the center T of the circle K lies within the circles L. If the angle $\beta$ is smaller than the angle $\alpha$, the center T lies outside the circles L. This is shown diagrammatically in FIG. 1b. From this figure it will be seen that the space angle within which the normal N is adjustable is enclosed in this case by two conical planes having the same axis formed by the line B but having different apices, i.e. $2\alpha+2\beta$ and $2\alpha-2\beta$ and having different circles of intersection, i.e. M and R. The angle $\beta$ is preferably at least equal to the angle $\alpha$, so that the centre T lies within the circles L.

A given turn of the supporting body 3 or the support 2 produces, in the case of larger angles $\alpha$ and $\beta$, a larger variation of the position of the normal N than in the case of smaller angles $\alpha$ and $\beta$. The accuracy of adjustment increases with decreasing angles $\alpha$ and $\beta$. Since, moreover, in practice usually a high accuracy of adjustment of an optical axis is required within only a small space angle, the angles $\alpha$ and $\beta$ are preferably smaller than 10° or even smaller than 4°.

Figure 2:
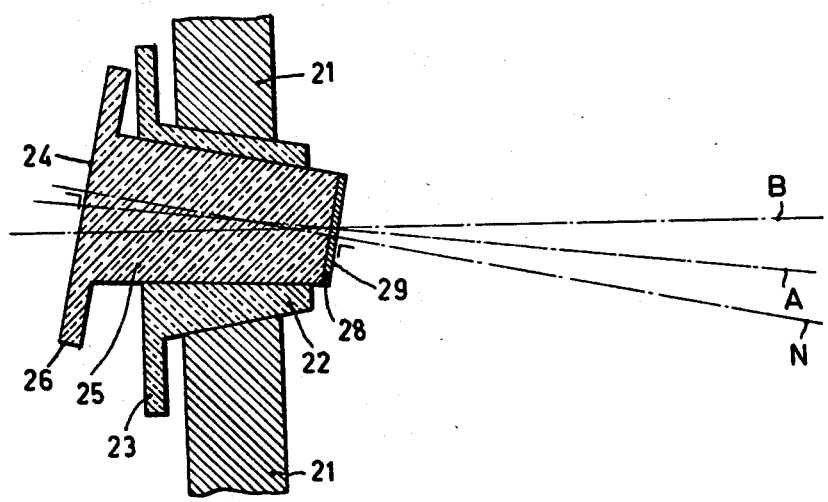
FIG. 2 shows diagrammatically in a cross sectional view a further embodiment of an optical system according to the invention.

FIG. 2 shows diagrammatically in a cross sectional view a particularly compact and simple embodiment of an optical system according to the invention. The holder 21, for example a flat plate, has a bore in which the supporting body 22 fits so as to be rotatable about the axis line B of the bore. The supporting body 22 has a bore in which a support 25 fits so as to be rotatable about the axis line A of the said bore. The supporting body 22 and the support 25 are provided with flanges 23 and 26 respectively for facilitating turning. The axis lines A and B are at an acute angle $\alpha$ to each other. The support 25 is provided with a mirror 28, having a reflective surface 29. N designates a normal on the mirror surface 29 and is at an acute angle $\beta$ to the axis line A. The simplicity of this structure is evident; it may be housed in an opening of a wall, which opening is closed by the system. Such structures are therefore extremely suitable for use in an optical maser, which will be explained more fully hereinafter.

It will be obvious that the lines A, B and N with systems according to the invention need not intersect each other at one point. The directions of these lines are the only important facts and in those cases in which the lines A, B and N do not intersect each other or intersect each other at different points, they may be considered to be translated parallel to themselves until they intersect each other at one point; then again there applies the above consideration for finding out the magnitude of the space angle within which the optical axis N is adjustable. Therefore, in the present description, the term "angle between two lines" is to denote the same in those cases in which the lines concerned do not intersect each other. In these cases the angle is meant which the lines enclose after parallel displacement to each other up to the point of intersection.

The bores in the bodies 21 and 22 and the fitting parts of the bodies 22 and 25 may be cylindrical. However, they are preferably tapering which is also shown in FIG. 2, so that the positions of the bodies 21, 22 and 25 are at the same time fixed.

The support 25 and also the supporting body 22 and the holder 21 are preferably made of an optical material, for example glass or quartz, in which case these bodies can be easily ground to fit accurately. In this case it is furthermore easy to cause a light beam to reflect via the support 25 on the rear side of the mirror 28; with the aid of said beam the position of the mirror can be checked. This is particularly important in the case of an optical maser. The surface 24 is preferably parallel to the mirror surface 29, which may be simply formed by a metalized surface part of the body 25.

Figure 3:
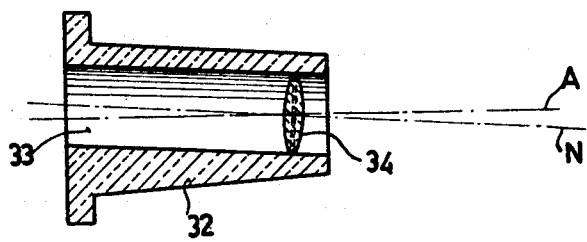
FIG. 3 shows a particular shape of the support of an optical system.

FIG. 3 shows diagrammatically in a cross sectional view a further embodiment of the support. In this case the support 32 is provided with a bore 33. The support 32 is cylindrical or conical and has a line of revolution A. The axis line of the bore is designated by N. In the bore 33 is accommodated in this embodiment a lens 34. The optical laxis of this lens substantially coincides with the line N. The lines A and N are at an acute angle β to each other.

In FIG. 2 the support 25 may be replaced by the support 32 of FIG. 3. This provides an adjusting mechanism for a lens.

The support 32 may be provided, not with a lens 34, but with a mirror consisting, for example, of a unilaterally metalized plano-parallel glass plate. The mirror may also be parabolic, hyperbolic or spherical.

An advantage of a support 32 of FIG. 3 is that light can reach unhindered the optical element from opposite sides, while in many cases the optical element can be fastened simply by fixing it at the edge.

Figure 4:
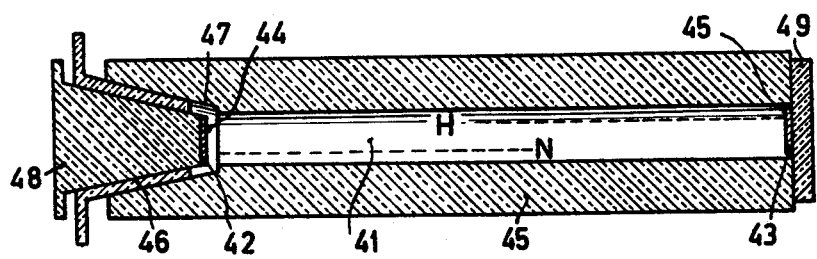
FIGS. 4 and 5 show diagrammatically in cross sectional views parts of an optical maser comprising an optical system according to the invention.

The invention furthermore relates to an optical maser, preferably a gas maser or a fluid maser, comprising an optical system according to the invention. Such a maser comprises a cavity 41 (see FIG. 4) for containing a medium, in which stimulated emission of radiation can be produced while the emitted radiation can be reflected on two opposite, preferably flat mirrors 42 and 43, lying each on one side of the medium, while a normal N on the surface 44 of the mirror 42 can be adjusted parallel to a normal H on the surface 45 of the mirror 43.

Parts not essential for this invention, for example a light source for activating the medium in the cavity 41, to which end the wall 45 of the cavity 41 must be at least locally transparent, are not shown in the figure.

The mirror 42 is adjustable and constitutes the optical element of an optical system according to the invention.

The wall 45 of the cavity 41 is preferably at the same time the holder of the optical system, in which the supporting body 46 thereof is rotatably arranged in the opening 47 in the wall 45 of the cavity 41 while the supporting body 46 with the support 48 of the system closes the opening 47. From FIG. 4 it appears that the adjusting mechanism for the mirror 42 is of the same type as that shown in FIG. 2.

The mirror 43 may be formed by a metalized surface part of a plate 49, for example of glass or quartz. The wall 45 may also be made of glass or quartz. The wall 45 and the plate 49 may be secured to each other by cementing.

The maser described above is less expensive and simpler than the masers comprising an extensible mirror, in which the possibility of adjustment is obtained, for example, by means of set screws and a resilient suspension of the mirror. Moreover, in the maser described here the adjustable mirror may be in contact with a gaseous or liquid medium, without involving structural disadvantages, which is practically impossible with the known masers, while the adjusting mechanism according to the invention is substantially not hindered by temperature fluctuations likely to occur during the operation of the maser.

Figure 5:
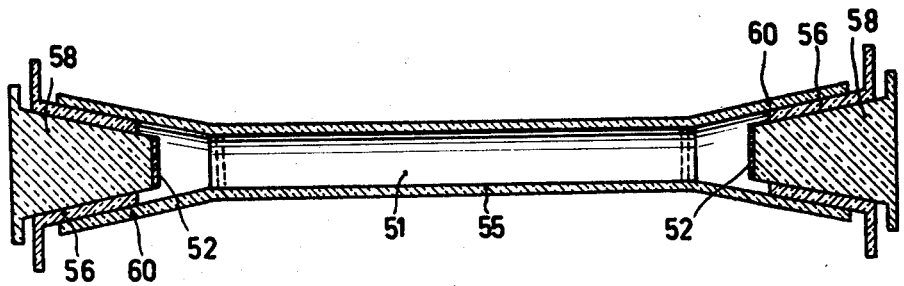

FIG. 5 shows an embodiment of a maser according to the invention with two adjustable mirrors. The possibility of adjustment is thus enlarged. The cavity 51 of the maser is surrounded, in this embodiment, by a tubular wall 55, for example of glass or quartz, having tapering ends 60, which serve as holders for the optical systems of the same kind as shown in FIG. 2. The mirrors of the optical systems are designated by 52, the supports by 58 and supporting bodies by 56.

From the embodiment described it will be apparent that optical systems according to the invention permit of obtaining a surprising simple structure of optical masers.

If the medium is formed by a fluid, there may be provided means to cause the fluid to flow through the cavity of the maser in operation. Thus the temperature control of the maser in operation is simplified. In this case the activation of given media may be performed before the medium enters the cavity of the maser. The wall of said cavity need then not be transparent.

It should be noted that with optical masers at least one of the mirrors is at least partly transparent in order to permit a radiation produced in the medium and moving between the mirrors of emanating partly. If, for example, the mirror 43 (FIG. 4) is partly transparent, the plate 49 must be transparent and if the mirror 42 is partly transparent, the support 48 must be transparent. With the maser shown in FIG. 5 at least one of the mirrors 52 is partly transparent, while the associated support 58 is transparent.

It will be obvious that the invention is not restricted to the embodiments described above and that those skilled in the art can apply many variations within the scope of the invention. For example, the support of an optical system according to the invention may consist of a rod-shaped portion and a disc-shaped portion, while the rod-shaped portion which has a smaller circular section than the disc-shaped portion, is secured at right angles to one side of the disc and the optical element is secured to the other side of the disc-shaped portion. The rod-shaped portion can then be held rotatably in a bore of the supporting body. Moreover, with an optical maser as shown in FIG. 5 partitions indicated by broken lines may be provided, which consist for example of transparent, plano-parallel glass or quartz plates in those cases in which the medium must not be in contact with the mirrors. With an optical system as shown in FIG. 2 the surface 24 may also be provided with a mirror, the reflective surface thereof being substantially orthogonal to the line N. With the aid of a light beam reflected on this surface, the position of the mirror 28, can then be checked in a simple manner, while the support 25 need not be transparent.

What is claimed is:

1. An optical maser comprising an optical resonator cavity having an active medium therein for maser radiation, said resonator including first and second opposing mirrors, the direction of the normal of said first mirror being adjustable relative to the direction of the normal of said second mirror, one end of said resonator being provided with a tapered bore, a mount having a tapered portion, a tapered sleeve support in said bore and having said tapered portion located therein, said sleeve support being rotatable in said bore about a first axis, said mount being rotatable in said bore about a second axis which makes an acute angle α with said first axis, said first mirror being positioned on said mount and having a normal making an acute angle β with the axis of said mount, and said sleeve support and mount together closing said tapered bore.

2. An optical maser as claimed in claim 1 wherein the angle $\beta$ is at least equal to the angle $\alpha$.

3. An optical maser as claimed in claim 1 wherein the angles $\alpha$ and $\beta$ are at most 10°.

4. An optical maser as claimed in claim 1 wherein at least said mount is constituted of a transparent material.

5. An optical maser as claimed in claim 1 wherein said first mirror is substantially flat and wherein said mount has a substantially flat surface part opposite the rear of said first mirror and substantially perpendicular to the normal of the first mirror so that a radiation beam travelling in a direction which traverses said surface part and then the back of said first mirror is reflected at said surface part and the back of said first mirror.

6. An optical maser as claimed in claim 1 wherein said first mirror constitutes a reflective surface of said mount.

References Cited

UNITED STATES PATENTS 3,225,307  12/1965  Weissman _____ 331—94.5

FOREIGN PATENTS 487,421  7/1918  France.

JEWELL H. PEDERSEN, *Primary Examiner.*

W. L. SIKES, *Assistant Examiner.*